United States Patent
Becker et al.

(10) Patent No.: US 9,338,945 B2
(45) Date of Patent: May 17, 2016

(54) ASYMMETRICAL FEED BEATER FOR A SINGLE ROTOR SEPARATOR

(71) Applicant: Deere & Company, Moline, IL (US)

(72) Inventors: Klaus E Becker, East Moline, IL (US); Snehalrao Jadhav, Satara (IN)

(73) Assignee: DEERE & COMPANY, Moline, IL (US)

( * ) Notice: Subject to any disclaimer, the term of this patent is extended or adjusted under 35 U.S.C. 154(b) by 119 days.

(21) Appl. No.: 14/169,785

(22) Filed: Jan. 31, 2014

(65) Prior Publication Data

US 2015/0173294 A1 Jun. 25, 2015

Related U.S. Application Data

(60) Provisional application No. 61/918,902, filed on Dec. 20, 2013.

(51) Int. Cl.
| | |
|---|---|
| *A01F 12/00* | (2006.01) |
| *A01F 12/38* | (2006.01) |
| *B02B 3/08* | (2006.01) |
| *A01F 12/18* | (2006.01) |
| *A01F 12/10* | (2006.01) |
| *A01F 12/39* | (2006.01) |

(52) U.S. Cl.
CPC .............. *A01F 12/182* (2013.01); *A01F 12/10* (2013.01); *A01F 12/39* (2013.01)

(58) Field of Classification Search
CPC ....... A01F 12/10; A01F 12/182; A01F 12/39; A01D 61/00
USPC ................ 460/113, 16, 78; 56/14.6
See application file for complete search history.

(56) References Cited

U.S. PATENT DOCUMENTS

| | | | | | |
|---|---|---|---|---|---|
| 682,193 | A | * | 9/1901 | Heggem .................. | A01F 12/00 460/113 |
| 2,467,501 | A | * | 4/1949 | Schoenrock ......... | A01D 61/008 56/123 |
| 2,978,097 | A | * | 4/1961 | Blanshine ............ | A01D 61/008 198/608 |
| 3,233,395 | A | * | 2/1966 | Dahl ..................... | A01D 57/30 198/657 |
| 4,170,235 | A | * | 10/1979 | Ashton ................... | A01F 12/10 460/16 |
| 4,492,237 | A | * | 1/1985 | Pakosh .................... | A01F 12/00 414/526 |
| 4,653,515 | A | * | 3/1987 | Tophinke ................ | A01F 12/10 460/78 |

(Continued)

FOREIGN PATENT DOCUMENTS

| | | | | | |
|---|---|---|---|---|---|
| AU | 2010253492 | A1 | * | 6/2011 | ............. A01D 75/02 |
| GB | 2467182 | A | * | 7/2010 | ............. A01F 7/067 |

(Continued)

*Primary Examiner* — Árpád Fábián-Kovács

(57) ABSTRACT

A feed beater (114) for a single-rotor, axial-flow combine (100) that comprises a cylinder (200) having a first end portion and a second end portion; first blades (202) fixed to the first end portion of the cylinder (200) and disposed at a first angle (alpha) with respect to a rotational axis (300) of the cylinder (200); second blades (204) fixed to the second end portion of the cylinder (200) and disposed at a second angle (beta) with respect to the rotational axis (300) of the cylinder (200); the first blades (202) spiral in a first direction over a first longitudinal extent of the cylinder (200); and the second blades (204) spiral in a second direction over a second longitudinal extent of the cylinder (200), wherein the second direction is opposite to the first direction, and further wherein the first longitudinal extent is greater than the second longitudinal extent.

9 Claims, 6 Drawing Sheets

(56) References Cited

U.S. PATENT DOCUMENTS

| | | | | |
|---|---|---|---|---|
| 4,739,773 A * | 4/1988 | West | A01F 12/442 | 460/113 |
| 4,976,654 A * | 12/1990 | Dammann | A01F 12/442 | 460/80 |
| 5,454,758 A * | 10/1995 | Tophinke | A01F 12/442 | 460/68 |
| 5,556,337 A * | 9/1996 | Tophinke | A01F 12/442 | 460/70 |
| 7,462,101 B2 * | 12/2008 | Grywacheski | A01F 12/20 | 460/119 |
| 8,109,815 B2 * | 2/2012 | Hollatz | A01F 7/067 | 460/16 |
| 8,118,652 B2 * | 2/2012 | Hollatz | A01F 7/06 | 460/113 |
| 9,043,959 B2 * | 6/2015 | Esken | A01F 12/39 | |
| 2002/0187820 A1 * | 12/2002 | Voss | A01F 7/067 | 460/73 |
| 2012/0102904 A1 * | 5/2012 | Syverson | A01D 44/00 | 56/8 |

FOREIGN PATENT DOCUMENTS

| | | | | |
|---|---|---|---|---|
| SU | 318642 A * | 4/1970 | | A01D 45/02 |
| SU | 1273039 A * | 6/1985 | | A01K 5/00 |
| SU | 1333262 A * | 3/1986 | | A01F 12/00 |
| SU | 1373353 A * | 9/1986 | | A01D 45/02 |

* cited by examiner

ASYMMETRICAL FEED BEATER FOR A SINGLE ROTOR SEPARATOR

RELATED APPLICATIONS

This application is related to and claims priority to U.S. Provisional Patent Application Ser. No. 61/918,902, which was filed 20 Dec. 2013.

FIELD OF THE INVENTION

The invention pertains to combine harvesters. More particularly, it relates to feed arrangements for combine harvesters. Even more particularly, it relates to feed beaters for feeding single rotor axial flow combine harvesters.

BACKGROUND

Combine harvesters are used in agriculture to harvest a wide variety of seed containing plants, such as rice, soybeans, wheat, oats, barley, rye, and canola. In one common arrangement, a feederhouse between 1 and 2 m wide is disposed at the front of the combine harvester (hereinafter "combine"). The feederhouse receives cut crop material from a harvesting head and conveys it rearward into a feed beater. The feed beater is in the form of elongate laterally extending roller, the roller having projections extending from its outer surface, typically in the form of spiral blades on each end. As the roller of the feed beater rotates, these spiral blades engage the cut crop material and pull it rearward into a feed housing while simultaneously pulling it inward from the end of the feed beater toward a central region of the roller.

The reason the feed beater pulls the cut crop material inward towards a central region of the roller is because part of the function of the feed beater is to reduce the width of the cut crop material into a thicker mat in the central region of the feed beater and insert it into the narrow mouth of a feed housing that extends between the feed beater and the front end of the combine rotor.

Once received in the feed housing, spiral blades on the front end of the combine rotor pull the cut crop material rearward into a gap between the cylindrical rotor and the stationary, generally cylindrical rotor housing that surrounds the rotor.

One problem with this prior art arrangement is that the cut crop material is inserted primarily rearward into the central region of the housing. This prior art arrangement does not feed the rotor well, and as a result the cut crop material jams in the rotor housing and does not feed evenly into the space between the rotor and the rotor housing for the next stage in the threshing and separating process.

What is needed, therefore, is a feed beater arrangement that feeds the cut crop material rearward and laterally into the feed housing for better feeding into the gap between the rotor and the rotor housing. It is an object of this invention to provide such a feed beater arrangement.

SUMMARY OF THE INVENTION

In accordance with a first aspect of the invention, a feed beater for a single-rotor, axial-flow combine is provided, comprising: a cylinder having a first end portion and a second end portion; first blades fixed to the first end portion of the cylinder and disposed at a first angle with respect to a rotational axis of the cylinder; second blades fixed to the second end portion of the cylinder and disposed at a second angle with respect to the rotational axis of the cylinder; wherein the first blades spiral in a first direction over a first longitudinal extent of the cylinder; and the second blades spiral in a second direction over a second longitudinal extent of the cylinder, wherein the second direction is opposite to the first direction, and the first longitudinal extent is greater than the second longitudinal extent.

The first angle may be smaller than the second angle.

An inner end of each of the first blades may be disposed adjacent to a corresponding inner end of each of the second blades.

An inner end of each of the first blades may be disposed on one side of a rotational axis of a rotor, and an inner end of an adjacent one of the second blades is also disposed on said one side of the rotational axis of the rotor.

The feed beater may further comprise straight blades that are fixed to the cylinder and extend generally parallel to the rotational axis of the feed beater, and each of the straight blades may have a first end and a second end.

Each of the first blades and the second blades may have an inner end and an outer end, and the outer end is located farther from a longitudinal midpoint of the cylinder than the inner end, and each inner end of the first blades is disposed adjacent to the first end of a straight blade and each inner end of the second blades is disposed adjacent to the second end of the straight blade.

The first blades may be disposed at the first angle with respect to the rotational axis of the cylinder over substantially the entire length of the first blades.

The first blades may be disposed at the first angle with respect to the rotational axis of the cylinder over a first longitudinal extent of the first blades, and further wherein the first blades are disposed at a third angle with respect to the rotational axis of the cylinder over a second longitudinal extent of the first blades.

The third angle may be greater than the first angle.

The first longitudinal extent of the first blades may be located closer to a longitudinal midpoint of the cylinder than the second longitudinal extent of the first blades.

The first blades may be disposed to draw cut crop material inward from a threshing roll toward a longitudinal midpoint of the cylinder and rearward toward a rotor.

DETAILED DESCRIPTION

As used herein, the terms "forward", "front", "in front of", and the like refer to a direction parallel to the direction of travel of the combine as it harvests crop. The terms "rearward", "rear", "behind", and the like refer to a direction opposite to the direction of travel of the combine as it harvests crops. The terms "lateral", "laterally", and the like refer to a direction that is generally horizontal and perpendicular to the direction of travel of the combine as it harvests crops.

Figure 1:
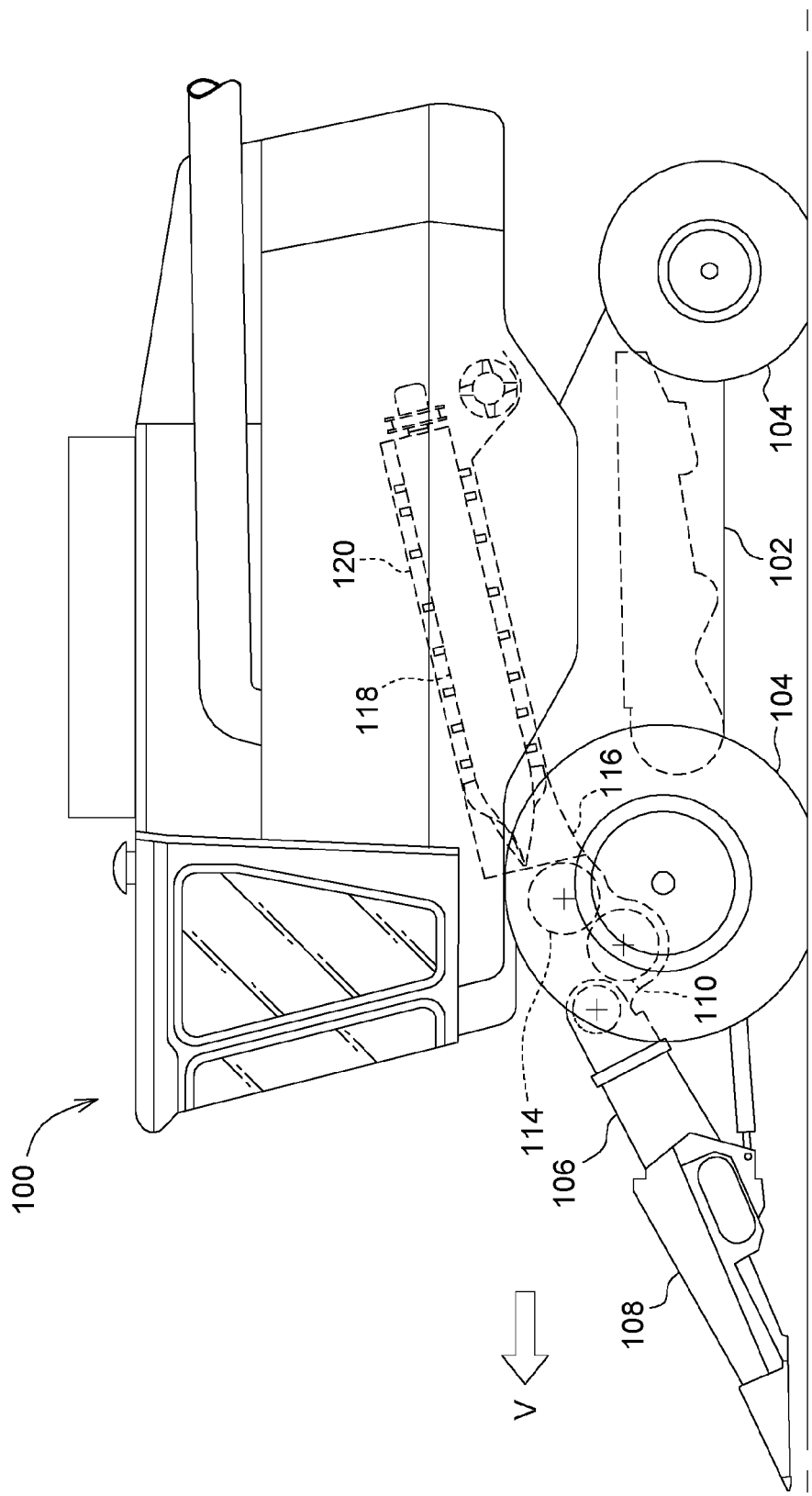
FIG. 1 is a side view of a combine harvester in accordance with the present invention.

FIG. 1 shows an agricultural combine 100 that comprises a chassis 102 that is supported on four wheels 104.

A feederhouse 106 is fixed to and extends forward from the front of the combine 100. An agricultural harvesting head 108 is supported on the front of the feederhouse 106.

Cut crop material is gathered by the agricultural harvesting head 108 which severs the crop from the ground and carries it rearward and laterally inward to the feederhouse 106. The feederhouse 106 has an internal conveyor (not shown) that carries the cut crop material rearward and upward toward the combine 100.

At the upper end of the feederhouse 106 and inside the combine 100, a feed accelerator 110 receives the cut crop material from the conveyor disposed in the feederhouse 106, and conveys the cut crop material rearward. The feed accelerator has protrusions (not shown) that extend outward from its outer surface. These protrusions engage the cut crop material and assist in carrying the cut crop material rearward. The feed accelerator 110 is generally cylindrical, and extends laterally, perpendicular to the direction of motion "V" of the combine 100 as it travels through the field harvesting crops.

A threshing roll 112 is disposed behind the feed accelerator 110 to receive the cut crop material from the feed accelerator 110, thresh it. The threshing roll 112 has protrusions (not shown) that extend outward from its outer surface. These protrusions force the cut crop material against a concave housing that surrounds the lower portion of the threshing roll 112 in order to thresh the cut crop material. Cut crop material falls through apertures in this concave housing and is carried away by other elements of the combine 100 for further processing.

A feed beater 114 is disposed behind the threshing roll 112 to receive the cut crop material (now threshed) and convey the cut crop material rearward. The feed beater 114 has protrusions that extend outward from its outer surface. These protrusions serve to draw the cut crop material laterally inward from the ends of the feed beater toward a central region of the feed beater at the same time that they convey the cut crop material rearward.

A feed housing 116 is disposed behind the feed beater 114 to receive the cut crop material from the feed beater 114 and convey the cut crop material rearward. The feed housing 116 has an inlet that is narrower (in a lateral direction) than the lateral width of the cut crop material entering the feed beater 114. It is for this reason that the feed beater 114 must convey crop laterally inward towards the center of the feed beater.

A rotor 118 is disposed in a rotor housing 120 to receive the cut crop material from the feed housing 116, pull it rearward, and into a gap defined between the rotor 118 and the rotor housing 120. Protrusions that extend outward from the outer surface of the rotor 118 and that extend inwardly from the inner surface of the rotor housing (not shown) work together to draw the cut crop material rearward and further separate the remaining grain from unwanted crop material ("material other than grain" or "MOG") such as plant stalks, stems, leaves husks and cobs.

The rotor 118 is generally cylindrical and circular in cross-section over its entire length. It has a forward portion 122 that is conical and tapers to a point 124 that is disposed inside the feed housing 116. The rear portion 125 of the rotor has a generally constant cross section.

The rotor 118 is driven in rotation by an internal combustion engine (not shown) on the combine 100. The rotor housing 120 surrounds the rotor 118 and is stationary.

Figure 2:
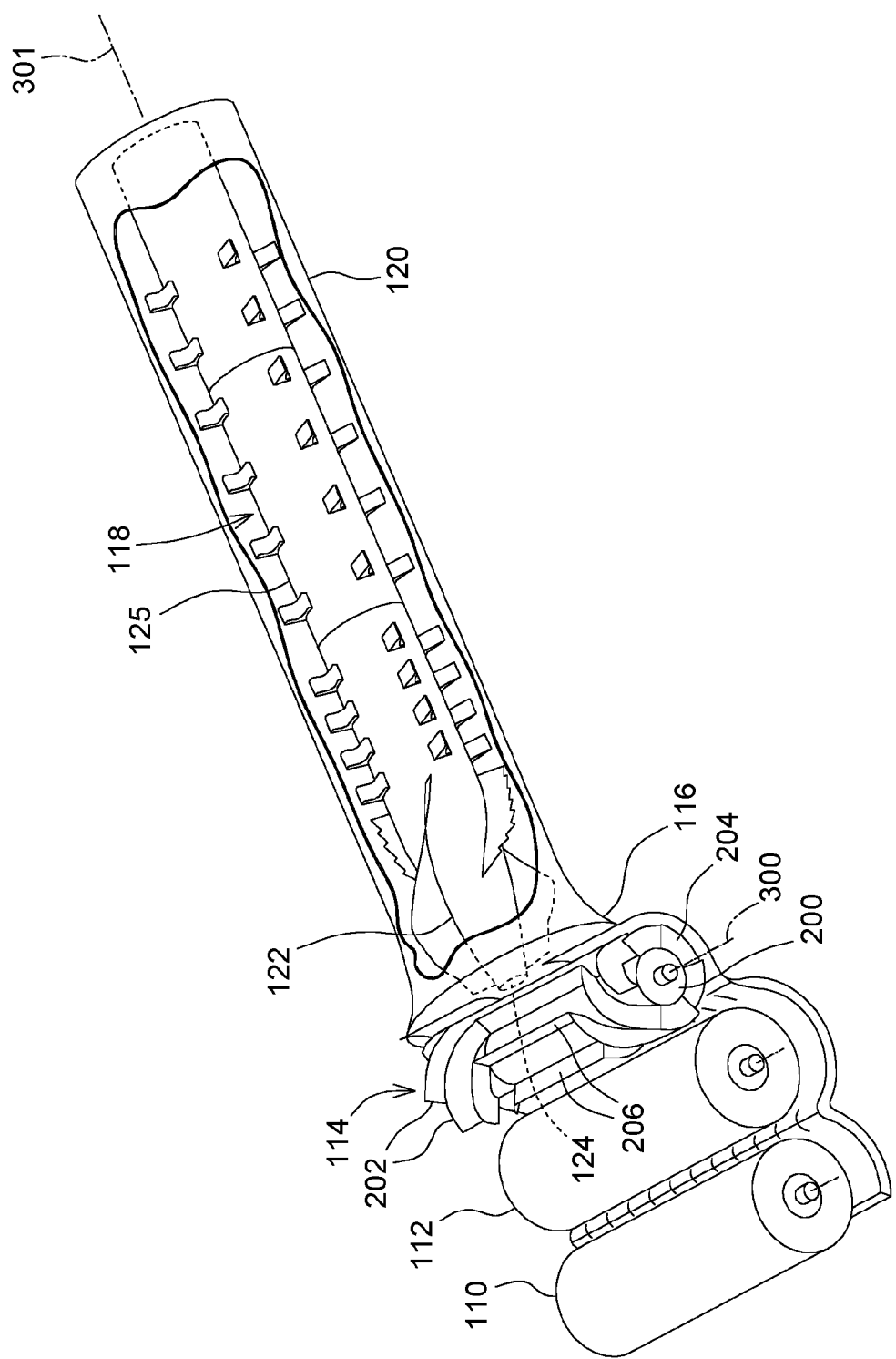
FIG. 2 is a fragmentary perspective view of a prior art feed beater together with the feed housing, rotor, and rotor housing of the arrangement of FIG. 1.

FIG. 2 shows a prior art feed beater 114, the feed housing 116, the rotor 118, and the rotor housing 120.

The feed beater 114 comprises a cylinder 200 that is elongate and that has a first end and a second end with protrusions that are elongate and extend from an outer surface of the cylinder 200. The feed beater 114 is driven in rotation by a motor (not shown) in the direction indicated by the arrow superimposed on the feed beater. The feed beater 114 has a longitudinal midpoint that is located midway between the opposite ends of the cylinder 200. The cylinder 200 has a longitudinal extent. This is the distance the cylinder extends in a direction parallel to a rotational axis 300 of the cylinder 200.

The protrusions are elongate and extend from the outer surface of the cylinder 200 at an angle with respect to the axis of rotation of the cylinder 200. The protrusions include first blades 202 that are fixed to and extend radially outward from the first end of the cylinder 200. When the cylinder 200 is rotated by a motor (not shown) the outer edges of the first blades 202 engage the cut crop material and draw the cut crop material both rearward toward the feed housing 116 and laterally inward towards the lateral center of the cylinder 200.

The first blades 202 are angled with respect to the surface of the cylinder 200 such that they draw the crop rearward and laterally inward from the first end of the cylinder 200. The first blades 202 spiral inwardly toward the lateral center of the cylinder 200 as the cylinder 200 rotates. The first blades 202 have longitudinal extent. This is the distance they extend in a direction parallel to the rotational axis of the cylinder 200.

The first blades 202 are spaced apart with respect to each other and are distributed evenly about the circumference of the cylinder 200.

The protrusions also include second blades 204 that are fixed to and extend radially outward from the second end of the cylinder 200. When the cylinder 200 is rotated by its motor, the outer edges of the second blades 204 engage the cut crop material and draw the cut crop material both rearward toward the feed housing 116 and laterally inward toward the lateral center of the cylinder 200.

The second blades 204 are angled with respect to the surface of the cylinder 200 such that they draw the crop rearward and laterally inward from the second end of the roller. The second blades 204 spiral inwardly toward the lateral center of the cylinder 200 as the cylinder 200 rotates. The second blades 204 have longitudinal extent. This is the distance they extend in a direction parallel to the rotational axis of the cylinder 200.

The second blades 204 are spaced apart with respect to each other and are distributed evenly about the circumference of the cylinder 200.

The first blades 202 and the second blades 204 are joined at their inner ends to straight blades 206. The straight blades 206 extend generally parallel to the longitudinal axis of the cylinder 200 and thus convey the cut crop material rearward, but do not convey it laterally in a direction parallel to the longitudinal axis of the cylinder 200. In the arrangement shown in FIG. 2, each of the first blades 202 is joined at its inner end to a first end of a corresponding straight blade 206, a second end of the corresponding straight blade 206 is joined to an inner end of the corresponding second blade 204.

In this manner, each first blade 202, each second blade 204, and each straight blade 206 form one continuous blade that extends across substantially the entire length of the cylinder 200, wherein the outer ends of the one continuous blade draw material laterally inwardly (and in opposite directions) toward a central region of the cylinder 200.

Figure 3:
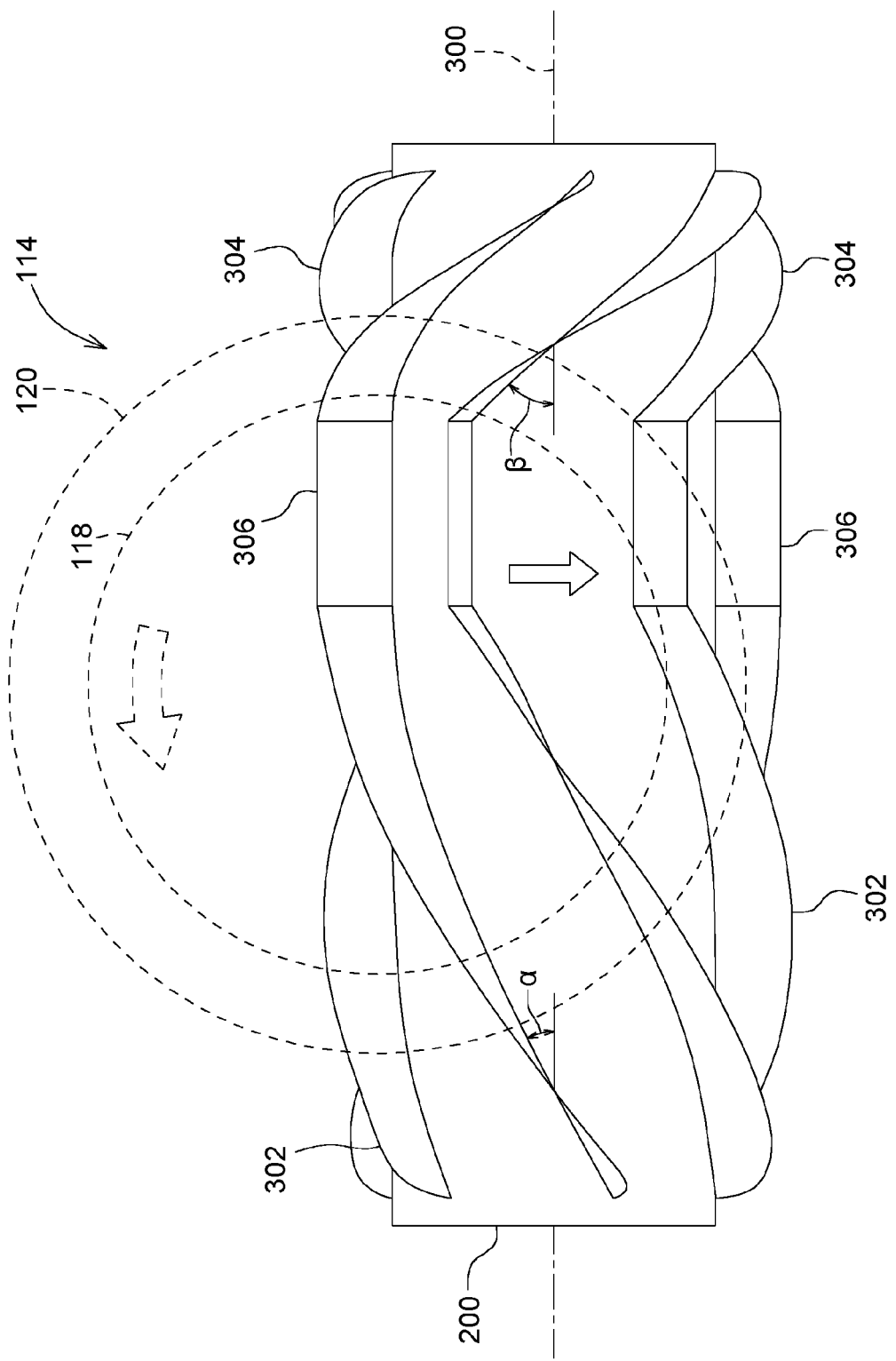
FIG. 3 is a front view of a first feed beater arrangement.

FIG. 3 shows a first embodiment of feed beater 114 in front view superimposed in front of the feed housing 116, rotor 118 and the rotor housing 120, with the rotor housing 120 being joined as an integral part with the feed housing 116. The rotor 118 is laterally centered, left and right, behind the feed beater 114 such that a plane normal to the laterally extending rotational axis 300 of the feed beater 114 intersects a longitudinally extending rotational axis 301 of the rotor 118. Thus, half of the feed beater 114 is disposed to the left of the rotational axis 301 and half of the feed beater 114 is disposed to the right of the rotational axis 301. The feed beater 114 is therefore laterally centered on the rotational axis of the rotor 118.

First blades 302 are disposed on the right side of the cylinder 200. Second blades 304 are disposed on the left side of the cylinder 200. Straight blades 306 are disposed toward the longitudinal midpoint of the cylinder 200 and are disposed between and fixed to the adjacent ends of the first blades 302 and the second blades 304.

The first blades 302 spiral with respect to the longitudinal axis 300 of the cylinder at an angle α. The angle α is constant over the length of the first blades 302. The second blades 304 spiral with respect to the longitudinal axis of the cylinder 200 at an angle β that is greater than the angle α. The angle β is constant over the length of the second blades 304.

The direction of spiral of the first blades 302 is opposite to the direction of spiral of the second blades 304. By this arrangement, the second blades 304 engage cut crop material and convey it underneath the feed beater 114 and into the feed housing 116 (not shown in FIG. 3) while simultaneously moving it to the right while the first blades 302 engage cut crop material and convey it underneath the feed beater 114 and into the feed housing 116 while simultaneously moving it to the left.

The first blades 302 are longer in a direction parallel to the rotational axis 300 of the feed beater 114 than the second blades 304 and, in fact, are longer than half the length of the cylinder 200. By this arrangement, the first blades 302 convey cut crop material farther along the length of the feed beater 114 than the second blades 304. By this arrangement, more cut crop material is deposited on the right side of the feed beater 114 (the "right side" is the left side of the feed beater 114 as shown in FIG. 3 since FIG. 3 is a front view). The net effect of this difference in length is that the cut crop material conveyed underneath the feed beater 114 and into the housing is introduced into the housing such that it is directed rearward toward the rotor to one side (the right side as shown in FIG. 3) of the rotational axis 301 of the rotor 118. By presenting the cut crop material to the rotor to one side of the rotational axis 301, the cut crop material is more easily drawn into the space between the rotor 118 and the rotor housing 120. This results in smoother feeding and less jamming of crop in the feed housing 116.

Figure 4:
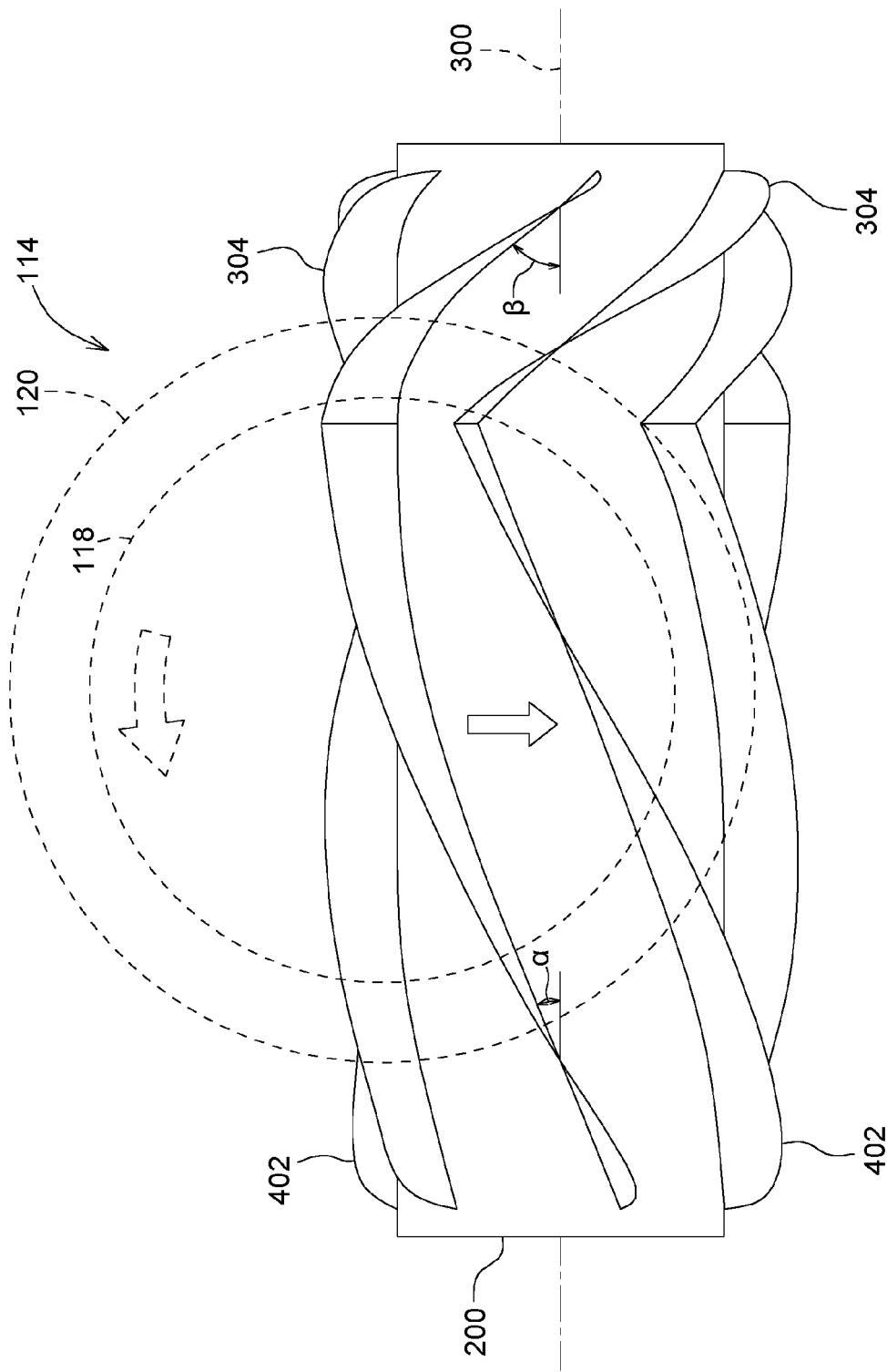
FIG. 4 is a front view of a second feed beater arrangement.

FIG. 4 shows an alternative arrangement of feed beater 114 in which the straight blades 306 have been eliminated, and inner ends of first blades 402 are disposed adjacent to the inner ends of the second blades 304. The inner ends of the first blades 402 and the inner ends of the second blades 304 may be fixed to each other. In another arrangement, the inner ends of the first blades 402 and the inner ends of the second blades 304 may be adjacent to each other. In all other respects, the construction and operation of the embodiment of FIG. 4 is the same as that of the embodiment of FIG. 3.

Figure 5:
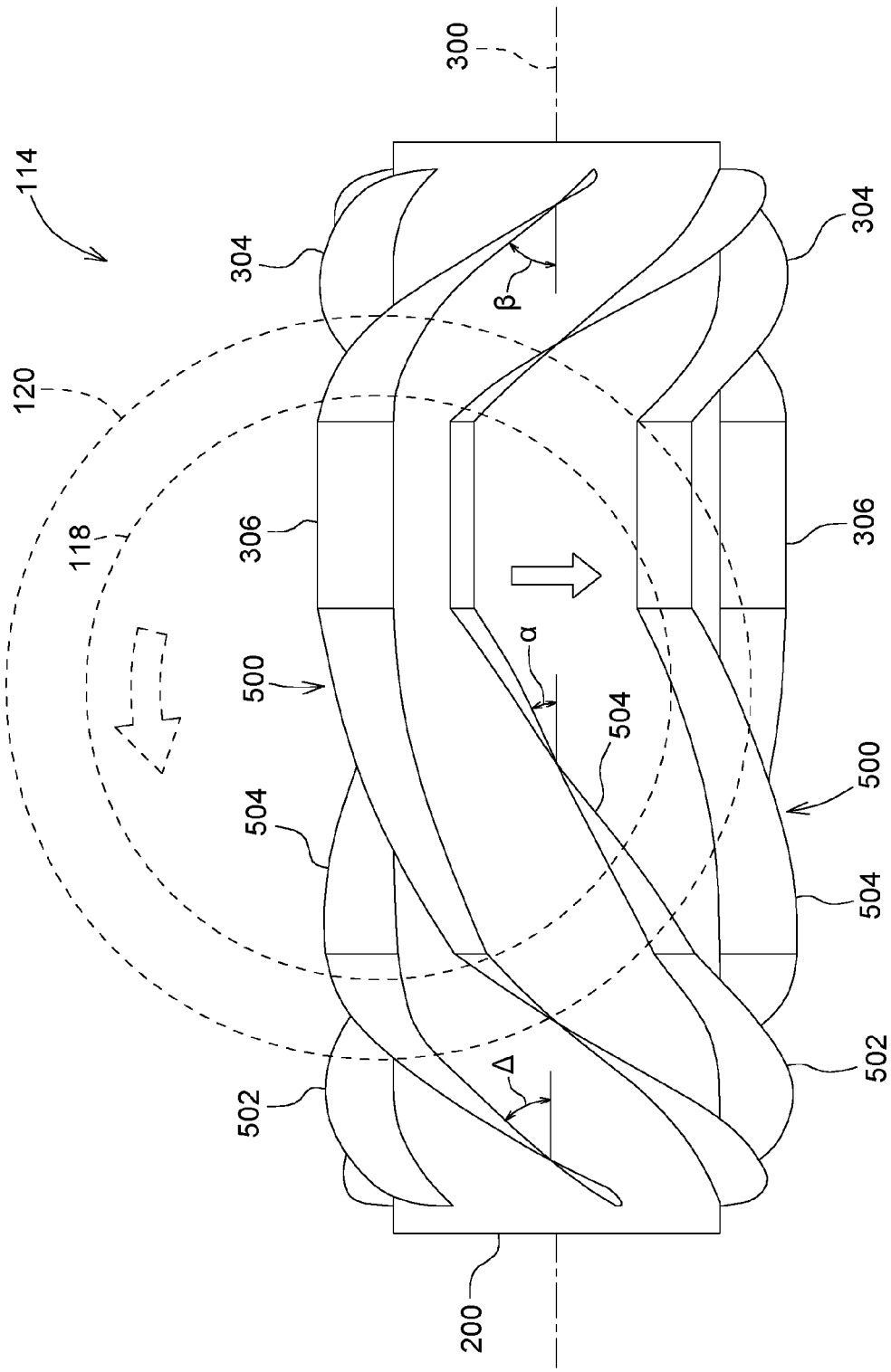
FIG. 5 is a front view of a third feed beater arrangement.

FIG. 5 shows another alternative arrangement of feed beater 114 similar to that of the FIG. 3 arrangement in that it includes the straight blades 306 connected between first blades 500 and the second blades 304. A difference between the two arrangements is that the first blades 500 have an outer section 502 with a longitudinal extent that is fixed to the outer surface of cylinder 200 and that is disposed at a larger angle Δ with respect to the rotational axis 300 of the feed beater 114. The first blades 500 have an inner section 504 with a longitudinal extent that is also fixed to the outer surface of cylinder 200 and is disposed at the angle α, the inner section 504 extending from the left end of the outer section 502 to a right end of the straight blades 306. The angle α is smaller than the angle Δ. By this arrangement, the cut crop material that enters the feed beater 114 at the right end (which is the left end as shown in FIG. 5) of the feed beater 114 is more aggressively conveyed toward a central region of the feed beater 114. The arrangement of FIG. 5 shows that the angle of the blades with respect to the rotational axis 300 of the feed beater 114 can change over their lengths. It also shows that the angle may become smaller as a blade extends from one end or the other end (or both) of the feed beater 114 toward the longitudinal midpoint of the feed beater 114. Although it has not been illustrated in FIG. 5, the second blades 304, which extend to left ends of the straight blades 306 can also have one or more longitudinal sections such as an inner section and an outer section wherein the outer section (or sections) have a larger angle β than an inner section (or sections).

Figure 6:
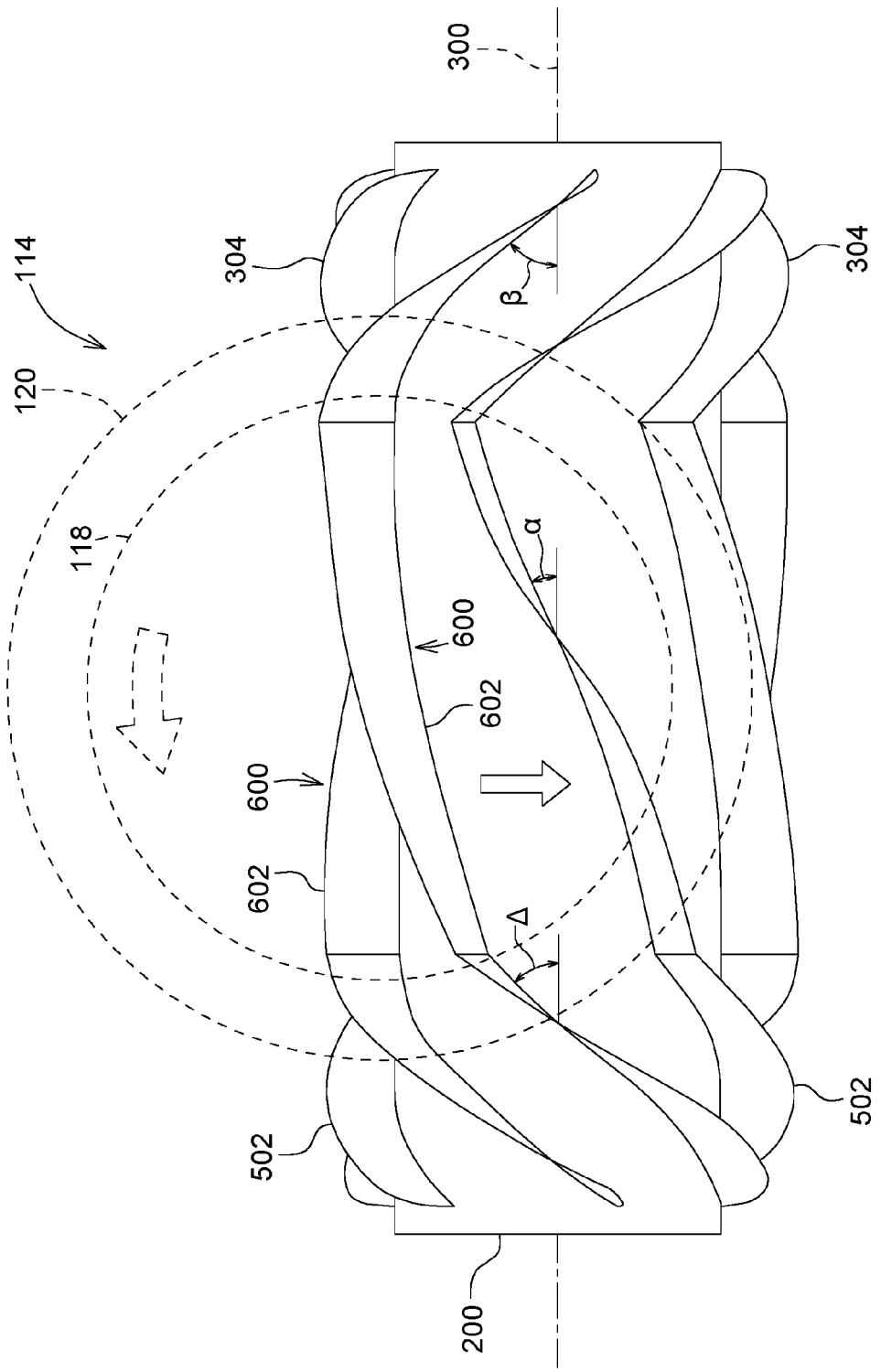
FIG. 6 is a front view of a fourth feed beater arrangement.

FIG. 6 shows a further alternative arrangement of feed beater 114 that differs from the arrangement of FIG. 5 by eliminating the straight blades 306. First blades 600 include the outer sections 502 of FIG. 5, but have inner sections 602 that differ from the inner sections 504 of FIG. 5 in that they have a longitudinal length spanning the longitudinal distance between the outer sections 502 and right ends of the second blades 304, noting that these blades 304 are identical to those of FIGS. 3-5.

In each of the arrangements of feed beater 114 respectively illustrated in FIGS. 3-6 herein, the blades are shown as equidistantly spaced with respect to adjacent blades about the circumference of the cylinder 200 of the feed beater. The adjacent blades need not be spaced equidistantly, however. Further, additional protrusions may be provided between adjacent blades to enhance the ability of the feed beater 114 to convey cut crop material. Even further, the first blades 302, 402, 500, 600, the second blades 304, and the straight blades 306 need not abut or be immediately adjacent to each other at their endpoints. For example, any of the illustrated arrangements can have the inner ends of the first blades rotationally offset from the inner ends of the second blades.

We claim:

1. A feed beater (114) for a single-rotor, axial-flow combine (100), comprising:
a cylinder (200) having opposite first and second ends and a first end portion extending from the first end beyond a midpoint between the first and second ends and a second end portion extending from the second end toward the midpoint and terminating short of the midpoint;
first blades (302, 402, 500, 600) fixed to the first end portion of the cylinder (200) and disposed at least at one of a first angle (α) and a third angle (Δ) with respect to a rotational axis (300) of the cylinder (200);
second blades (304) fixed to the second end portion of the cylinder (200) and disposed at a second angle (β) with respect to the rotational axis (300) of the cylinder (200);
wherein the first blades (302, 402, 500, 600) are the only blades fixed to the first end portion of the cylinder (200) and each is disposed to spiral in a first direction about the cylinder (200) and each extends substantially an entire length of the first end portion of the cylinder (200); and
wherein the second blades (304) are the only blades fixed to the second end portion of the cylinder (200) and each is disposed to spiral in a second direction and extend substantially an entire length of the second end portion of the cylinder (200), wherein the second direction is opposite to the first direction, and further wherein the longitudinal extent of the first end portion is greater than the longitudinal extent of the second end portion.

2. The feed beater (114) of claim 1, wherein the first angle (α) is smaller than the second angle (β) and smaller than the third angle (Δ).

3. The feed beater (114) of claim 1, wherein an inner end of each of the first blades (302, 402, 500, 600) is disposed adjacent to a corresponding inner end of each of the second blades (304).

4. The feed beater (114) of claim 1, further comprising straight blades (306) that are fixed to the cylinder (200) so as to be entirely between the first and second end portions and that extend generally parallel to the rotational axis (300) of the feed beater (114), wherein each of the straight blades (306) has a first end and a second end.

5. The feed beater (114) of claim 4, wherein each of the first blades (302, 402, 500, 600) and the second blades (304) has an inner end and an outer end, and further wherein each outer end is located farther from the longitudinal midpoint of the cylinder (200) than each inner end, and further wherein each inner end of the first blades (302, 402, 500, 600) is disposed adjacent to the first end of a respective one of the straight blades (306) and each inner end of the second blades (304) is disposed adjacent to the second end of the respective one of the straight blades (306).

6. The feed beater (114) of claim 1, wherein the first blades (302, 402) are disposed at the first angle (α) with respect to the rotational axis (300) of the cylinder (200) over substantially the entire length of the first blades (302, 402).

7. The feed beater (114) of claim 1, wherein the first blades (500, 600) each include a first section (502, 602) disposed at the third angle (Δ) with respect to the rotational axis (300) of the cylinder (200) over an outer portion of the first end portion of the cylinder (200), and further wherein the first blades (500, 600) each include a second section (504, 602) disposed at the first angle (α) with respect to the rotational axis (300) of the cylinder (200) over an inner portion of the first end portion of the cylinder (200).

8. The feed beater (114) of claim 7, wherein the third angle (Δ) is substantially equal to the second angle (β).

9. The feed beater (114) of claim 7, wherein the first end sections of the first blades (500, 600) are substantially identical to the first blades (304).

* * * * *